No. 666,666. Patented Jan. 29, 1901.
J. L. HACKETT.
DEVICE FOR PICKING FRUIT.
(Application filed May 17, 1900.)

(No Model.)

Attest:
M. L. Winston
C. H. Plumb

Inventor:
J. L. Hackett,
By E. B. Whitmore,
Atty.

THE NORRIS PETERS CO., PHOTO-LITHO., WASHINGTON, D. C.

UNITED STATES PATENT OFFICE.

JOHN L. HACKETT, OF ROCHESTER, NEW YORK.

DEVICE FOR PICKING FRUIT.

SPECIFICATION forming part of Letters Patent No. 666,666, dated January 29, 1901.

Application filed May 17, 1900. Serial No. 17,002. (No model.)

*To all whom it may concern:*

Be it known that I, JOHN L. HACKETT, of Rochester, in the county of Monroe and State of New York, have invented a new and useful Improvement in Devices for Picking Fruit, which improvement is fully set forth in the following specification and shown in the accompanying drawings.

My invention is a device for picking or gathering fruit and certain of the garden vegetables; and it consists of two coacting parts, one to be worn upon the thumb and the other upon the opposing index-finger.

The object of the invention is to produce a device by means of which a person gathering fruit or vegetables need use but one hand in the operation of severing the stems and holding the detached masses—that is to say, he may primarily pass the hand supplied with the picking device around the body to be detached and then conveniently sever the stem, at the same time holding the fruit in the hand, the other hand being employed in holding a receptacle for the gathered product or for holding to a ladder or for other use, as the case may be.

The invention is hereinafter fully described, and more particularly pointed out in the claims.

Figure 1:
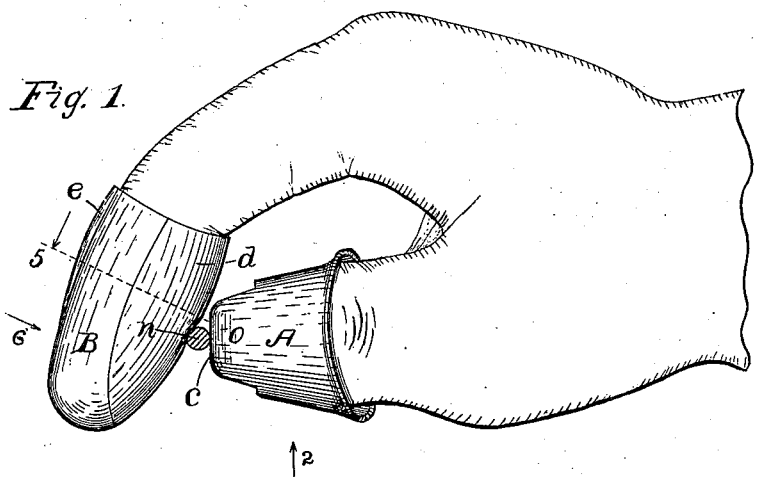
Figure 2:
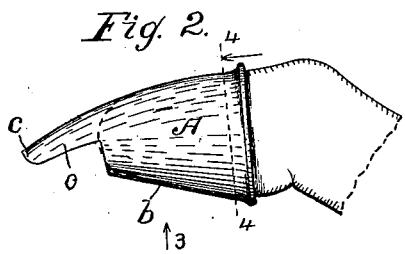
Figure 4:
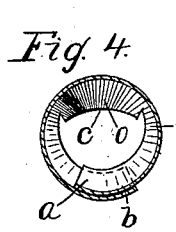
Figure 3:
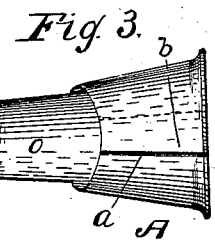
Figure 5:
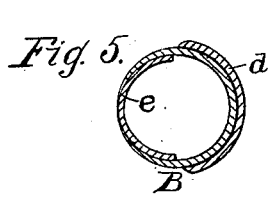
Figures 7, 8:
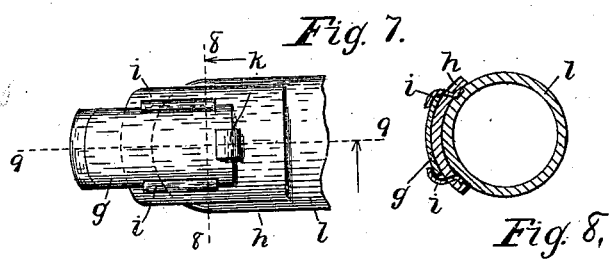
Figure 6:
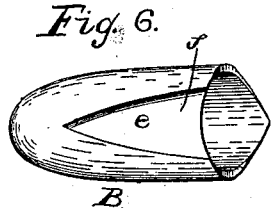
Figure 9:
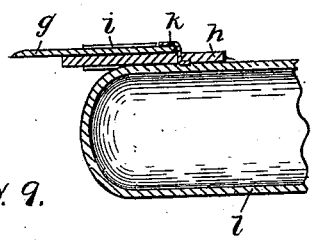

Referring to the drawings, Figure 1 shows the device as applied to the hand and in use. Fig. 2 is a view of the thumb-piece or cutter, seen as indicated by arrow 2 in Fig. 1. Fig. 3 is a view of the thumb-piece, seen as indicated by arrow 3 in Fig. 2. Fig. 4 is a transverse section on the dotted line 4 4 in Fig. 2. Fig. 5 is a transverse section of the finger-piece on the dotted line 5 in Fig. 1. Fig. 6 is a view of the rear side of the finger-piece, seen as indicated by arrow 6 in Fig. 1, showing the division and gusset. Fig. 7 is a plan of a modified form of the thumb-piece, showing a detachable cutter. Fig. 8 is a transverse section on the dotted line 8 8 in Fig. 7, showing the side holders for the cutter. Fig. 9 is a longitudinal section on the dotted line 9 9 in Fig. 7.

Referring to the parts shown, A is the thumb-piece of the device, it being a hollow conical steel body constituting a cutter adapted to be passed upon and held at the end of the thumb, as shown. This device is preferably made in one piece cut from sheet-steel and bent to form. It is longitudinally divided over the fleshy part of the thumb, having the divided edges or parts *a b* lapped upon each other, as shown in Figs. 3 and 4. The metal being yielding and elastic, the thumb-piece when crowded onto the thumb holds to place by spring action. The thumb-piece is formed with an extended part *o* at the forward end, terminating in a cutting edge *c*, having a rounded or oval form for severing the stems of the fruit.

The finger-piece B, opposing the cutter A, consists of a hollow part or covering for the finger in the form of a cot or sheath, preferably of fibrous material, as buckskin, reinforced over the fleshy part of the finger by a pad *d*, Figs. 1 and 5, of hard leather or some similar material, to receive the thrust of the cutter and protect the finger. This finger-piece is divided on the rear side opposite the pad *d* and supplied with a gusset *e*, Figs. 1, 5, and 6 of yielding material, as india-rubber, covering the divided part of the cot, so that when pressed upon the finger the cot will hold to place on account of the elasticity of the yielding part *e*. This piece of india-rubber is preferably cemented against the inner surface of the cot, as shown, in position to cross and close the longitudinal slit or opening *f* in the rear side of the cot.

In Fig. 1 is shown the positions of the parts when in the act of severing a stem *n* of the fruit, the latter being inclosed by the hand. By cutting the stem in this manner the latter remains with the fruit, which is desirable, as the fruit retains its state of freshness much longer when the stem remains attached to it than when torn out of or away from it. In case of gathering grapes, for example, if the stems be pulled or wrenched from the vine the berries are liable to be detached from the stem or perchance crushed by the hand in the effort to part the stem, particularly if the latter be tough and strong, as is frequently the case. By employing the cutter herewith shown the stem of the fruit is readily cut and with only a gentle pressure of the hand against the fruit, so that the latter remains uninjured.

In the modification shown in Figs. 6 to 8 the steel cutter *g* is held removably to a base piece or holder $h$ by metal clips $i\,i\,k$, the latter clip serving to receive the rear end thrust of the cutter when the latter is pressed against the stem of the fruit in the act of cutting the same. These clips lap over the respective edges of the cutter and passing through the base-piece $h$ are turned back between the latter and the cot or sheath $l$, to which the base-piece is secured. In this form of the device the cutter proper, $g$, may be removed from its holdings for the purpose of reëdging or for protecting the edge when out of use.

What I claim as my invention is—

1. A device for picking fruit, consisting of a cutting part or cutter held upon the thumb and having its cutter extending in the direction of the length of such part and adapted to cut by endwise pressure, and an opposing coacting part held by the finger, substantially as shown and described.

2. A device for picking fruit, consisting of a metal elastic cutting part or cutter held upon the thumb by spring action, and an opposing part held by the finger and constructed, in action, to be disposed at right angles to said cutter, substantially as specified.

3. A device for picking fruit, consisting of a hollow metallic elastic cutting part or cutter held by the thumb, and an opposing part held by the finger, the body of said metallic cutter being conical, and open at one side, with overlapping parts, and the cutter shaped at its extreme end to cut by endwise pressure, substantially as shown.

4. A device for picking fruit, consisting of a hollow metallic part to pass over the thumb, formed with an extended part having a cutting edge at its outer end and adapted to cut by endwise pressure toward the index-finger, said hollow part being elastic and divided longitudinally over the ball of the thumb, in combination with an opposing part to cover the finger, substantially as shown and described.

5. A device for picking fruit, consisting of a cutting part held upon the thumb, and an opposing coacting part B for the finger adapted to receive the end thrust of said cutting part, at right angles to which it is disposed, said part B being hollow and divided longitudinally at one side, and an elastic part secured thereto to cover the divide or opening in the part B, substantially as and for the purpose specified.

In witness whereof I have hereunto set my hand, this 7th day of May, 1900, in the presence of two subscribing witnesses.

JOHN L. HACKETT.

Witnesses:
ENOS B. WHITMORE,
M. L. WINSTON.